(12) United States Patent
Burdick et al.

(10) Patent No.: US 8,074,999 B2
(45) Date of Patent: Dec. 13, 2011

(54) DYNAMIC SEALING ARRANGEMENT FOR MOVABLE SHAFT

(75) Inventors: Wade A. Burdick, Fort Collins, CO (US); Gary M. Bowman, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 1216 days.

(21) Appl. No.: 11/539,216

(22) Filed: Oct. 6, 2006

(65) Prior Publication Data

US 2007/0085279 A1     Apr. 19, 2007

Related U.S. Application Data

(63) Continuation of application No. 10/440,507, filed on May 15, 2003, now Pat. No. 7,118,114.

(51) Int. Cl.
*F16J 15/18* (2006.01)
*F16J 15/26* (2006.01)
*F16J 15/32* (2006.01)

(52) U.S. Cl. ......... 277/510; 277/516; 277/549; 277/562

(58) Field of Classification Search .......... 277/510, 277/516, 562, 549
See application file for complete search history.

(56) References Cited

U.S. PATENT DOCUMENTS

| | | | |
|---|---|---|---|
| 1,593,533 A | 7/1926 | Joyce | |
| 1,636,752 A | 4/1927 | Mitchell | |
| 1,721,737 A | 7/1927 | Joyce | |
| 1,779,938 A | 10/1930 | Joyce | |
| 1,788,496 A * | 1/1931 | Smith et al. | 277/530 |
| 1,835,887 A | 12/1931 | Mackey | |
| 2,427,656 A | 9/1947 | Blom | |
| 3,176,996 A | 4/1965 | Barnett | |
| 3,297,329 A | 1/1967 | Smith et al. | |
| 3,334,906 A | 8/1967 | Arnold | |
| 3,589,737 A | 6/1971 | Sedy | |
| 3,774,877 A | 11/1973 | Robertson | |
| 3,869,131 A | 3/1975 | Derner | |

(Continued)

FOREIGN PATENT DOCUMENTS

DE     3827930     2/1990

(Continued)

OTHER PUBLICATIONS

U.S. Appl. No. 60/096,877, filed Aug. 17, 1998, Arbuckle.

(Continued)

*Primary Examiner* — Vishal Patel
(74) *Attorney, Agent, or Firm* — Reinhart Boerner Van Deuren P.C.

(57) ABSTRACT

A dynamic sealing arrangement for preventing leakage of a fluid along a shaft includes multiple seals and pressurized barrier sealant is presented. According to one aspect, at least three seals are arranged along the shaft with pressurized barrier sealant between the first and second seals and a collection area is provided between the second and third seals to collect any leakage that might occur. Collected leakage, if any, is ported to an output port. According to another aspect, a unitary seal block member is provided that supports the dynamic sealing arrangement for the shaft and defines a piston chamber and a drilled passageway connecting the piston chamber and barrier sealant pressurization chamber between two seals. A substantial amount of plumbing is self contained in a single body minimizing the need for additional components or complexity.

4 Claims, 5 Drawing Sheets

U.S. PATENT DOCUMENTS

| | | | |
|---|---|---|---|
| 3,887,195 A | | 6/1975 | Vinciguerra |
| 3,954,348 A | | 5/1976 | Renaud |
| 3,955,822 A | | 5/1976 | Irby |
| 4,222,575 A | * | 9/1980 | Sekiguchi et al. ............ 277/558 |
| 4,289,445 A | | 9/1981 | Sims |
| 4,290,611 A | | 9/1981 | Sedy |
| 4,295,653 A | | 10/1981 | Coles |
| 4,354,664 A | | 10/1982 | Taylor et al. |
| 4,384,820 A | | 5/1983 | Sims |
| 4,475,735 A | | 10/1984 | Smuda et al. |
| 4,505,115 A | | 3/1985 | Arbuckle |
| 4,509,897 A | | 4/1985 | Sims |
| 4,537,385 A | | 8/1985 | Bragg et al. |
| 4,702,269 A | | 10/1987 | Schuler |
| 4,819,948 A | | 4/1989 | Merrifield |
| 4,858,937 A | | 8/1989 | Fairlie-Clarke et al. |
| 4,915,579 A | | 4/1990 | Whittier et al. |
| 4,922,719 A | | 5/1990 | Arbuckle |
| 4,960,039 A | | 10/1990 | Robertson |
| 5,052,720 A | * | 10/1991 | Yoda ............................... 285/14 |
| 5,178,363 A | | 1/1993 | Icenhower et al. |
| 5,203,370 A | | 4/1993 | Block et al. |
| 5,209,495 A | | 5/1993 | Palmour |
| 5,211,532 A | | 5/1993 | Thompson |
| 5,244,183 A | | 9/1993 | Calvin et al. |
| 5,305,854 A | | 4/1994 | Wheeler |
| 5,412,977 A | | 5/1995 | Schmohl et al. |
| 5,474,307 A | | 12/1995 | DeBiasse et al. |
| 5,562,406 A | | 10/1996 | Ooka et al. |
| 5,607,165 A | | 3/1997 | Bredemeyer |
| 5,636,847 A | | 6/1997 | Ostrowski |
| 5,643,026 A | | 7/1997 | Pietsch et al. |
| 5,676,382 A | | 10/1997 | Dahlheimer |
| 5,746,435 A | | 5/1998 | Arbuckle |
| 5,772,216 A | * | 6/1998 | Bredemeyer .................. 277/318 |
| 5,823,541 A | | 10/1998 | Dietle et al. |
| 5,906,374 A | | 5/1999 | Arbuckle |
| 5,921,554 A | | 7/1999 | Derian et al. |
| 6,161,835 A | | 12/2000 | Arbuckle |
| 6,161,838 A | * | 12/2000 | Balsells ........................ 277/511 |
| 6,162,031 A | | 12/2000 | Tremoulet, Jr. |
| 6,210,107 B1 | | 4/2001 | Volden et al. |
| 7,118,114 B2 | | 10/2006 | Burdick et al. |

FOREIGN PATENT DOCUMENTS

| | | |
|---|---|---|
| EP | 0308390 | 3/1989 |
| EP | 0499745 | 8/1992 |
| EP | 0624742 | 11/1994 |
| EP | 1012081 | 10/2001 |
| EP | 1231418 | 8/2002 |
| EP | 1239197 | 9/2002 |
| JP | 57116974 A2 | 7/1982 |
| JP | 60136665 | 7/1985 |
| JP | 5001776 A2 | 1/1993 |
| JP | 5106746 A2 | 4/1993 |
| WO | WO 96/10707 | 4/1996 |
| WO | WO 97/13713 | 4/1997 |
| WO | WO 97/34095 | 9/1997 |
| WO | WO 03/021142 | 3/2003 |

OTHER PUBLICATIONS

U.S. Appl. No. 60/096,738, filed Aug. 17, 1998, Arbuckle.

U.S. Appl. No. 10/340,017, filed Jan. 10, 2003, Greeb et al.

\* cited by examiner

DYNAMIC SEALING ARRANGEMENT FOR MOVABLE SHAFT

CROSS-REFERENCE TO RELATED PATENT APPLICATIONS

This patent application is a continuation of co-pending U.S. patent application Ser. No. 10/440,507, filed May 15, 2003.

BACKGROUND

The dynamic sealing arrangement described herein pertains to seal assemblies and more particularly to pressurized dynamic seal arrangements.

The proposed use of a pressurized barrier sealant fluid between two seals for fluid control apparatus such as pumps, valves and the like is generally known. For example, pressurized dynamic shaft sealing arrangements are disclosed in U.S. Pat. No. 5,746,435 to Arbuckle, U.S. Pat. No. 6,161,835 to Arbuckle, U.S. Pat. No. 5,772,216 to Bredemeyer and U.S. Pat. No. 5,607,165 to Bredemeyer. Such pressurized dynamic sealing arrangements may be used in the process gas industry for valves and the like to better ensure that process gas (e.g. natural gas, gaseous fuel, etc.) does not leak or cause a hazardous external environment.

These patents disclose that use of pressurized barrier sealant provides opposing axial fluid forces on two spaced apart seals. In these arrangements, the barrier sealant fluid pressure is typically greater than the process gas pressure such that if leakage is to occur, most or all of the leakage would be the barrier sealant rather than process gas. Indicating mechanisms are disclosed in these patents that indicate whether sealant leakage is occurring.

The problem with the concepts disclosed in the foregoing patents is that the concepts appear to be complex and costly to implement. More specifically, these proposals have complex plumbing arrangements, are not practical to structurally implement, and/or require numerous complex components for establishing a preload barrier. Further, the indicating mechanism disclosed in at least some of these patents may have accuracy problems, may not readily indicate the exact source of the problem and/or may be difficult or impractical to implement in the field or across different applications. Finally as will be appreciated by the present invention, these prior art concepts are subject to potential premature failure or leakage.

BRIEF SUMMARY

According to one aspect, the dynamic sealing arrangement provides for preventing leakage of a fluid along a shaft, comprising at least three seals arranged along the shaft with pressurized barrier sealant between the first and second seals and a collection area to collect any leaked gas or barrier sealant between the second and third seals.

An apparatus including this sealing arrangement includes a housing adapted to receive the fluid. A shaft extends through the housing and is movable relative thereto. A first seal is supported by the housing and sealingly engages the shaft. A second seal is also supported by the housing and sealingly engages the shaft in spaced axial relation to the first seal. Barrier sealant contained between the first and second seals is pressurized by a load member to provide opposing axial forces on the first and second seals. A third seal supported by the housing sealingly engages the shaft in spaced relation to the second seal and collection area in the housing between the second and the third seals. A collection passageway in the housing connects the collection area to an output port which can be mounted to instrumentation and/or collection apparatus which can be used to determine how well the sealing arrangement is performing, or it can be plugged and sealed off or vented through a filter that prevents ingress of material.

One aspect of the preferred embodiment is that the third seal is arranged as an external seal proximate the external environment to prevent ingress of dust, grit and other contaminants, thereby ensuring that the seals which are subject to axial barrier sealant loads are free of contaminants from the external contaminant that could cause premature failure.

In accordance with another aspect, a unitary seal block member is provided that supports the dynamic sealing arrangement for the shaft and defines a piston chamber and a drilled passageway connecting the piston chamber and barrier sealant pressurization chamber between two seals. Thus, a substantial amount of plumbing is self contained in a single body minimizing the need for additional components or complexity.

Other aspects, objectives and advantages will become more apparent from the following detailed description when taken in conjunction with the accompanying drawings.

DETAILED DESCRIPTION

Figure 3:
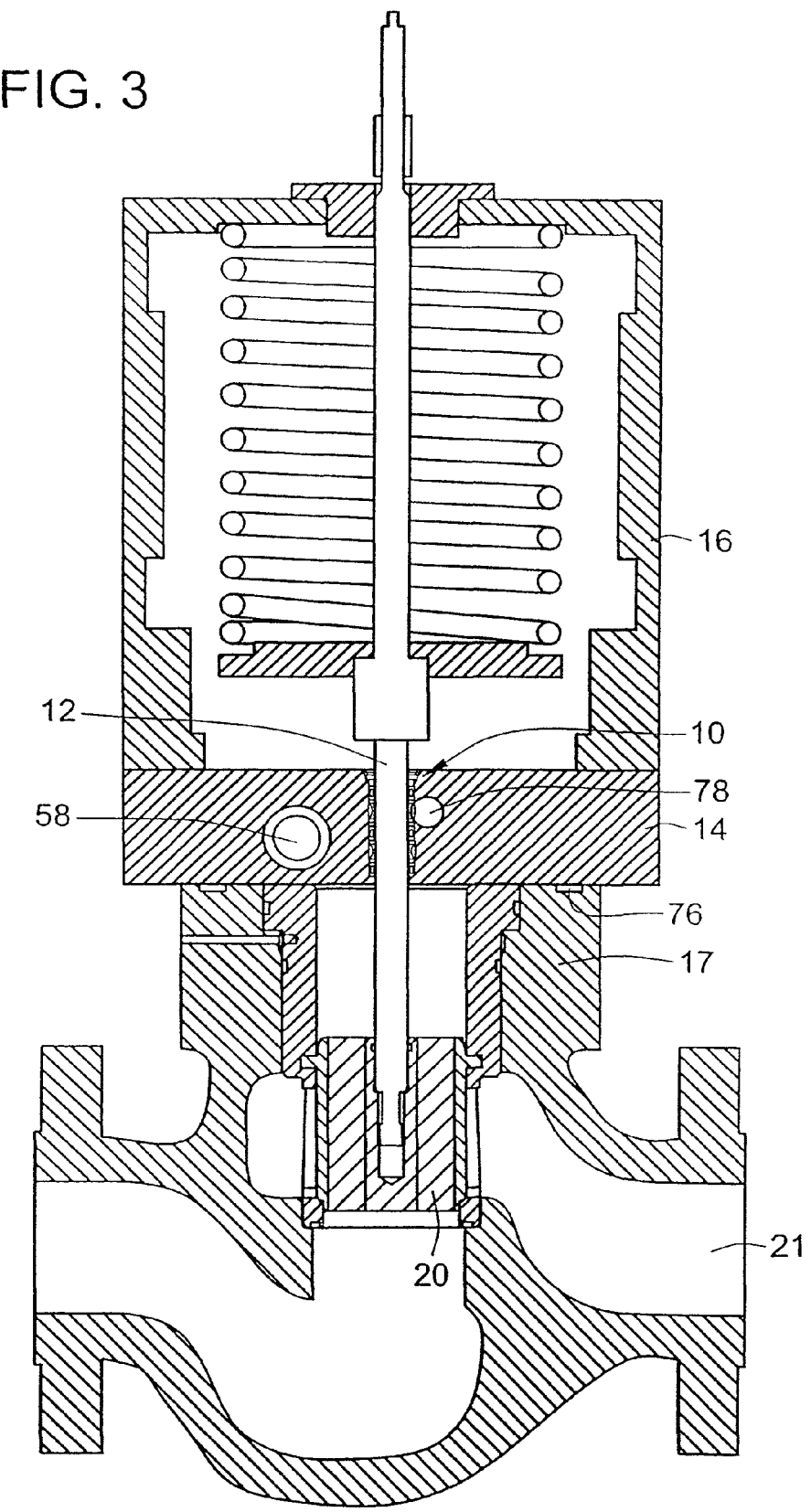
FIG. 3 is a cross sectional view of a seal mounting block mounted between a spring housing and a valve body for sealing against a movable shaft according to an embodiment of the dynamic sealing arrangement.
Figure 4:
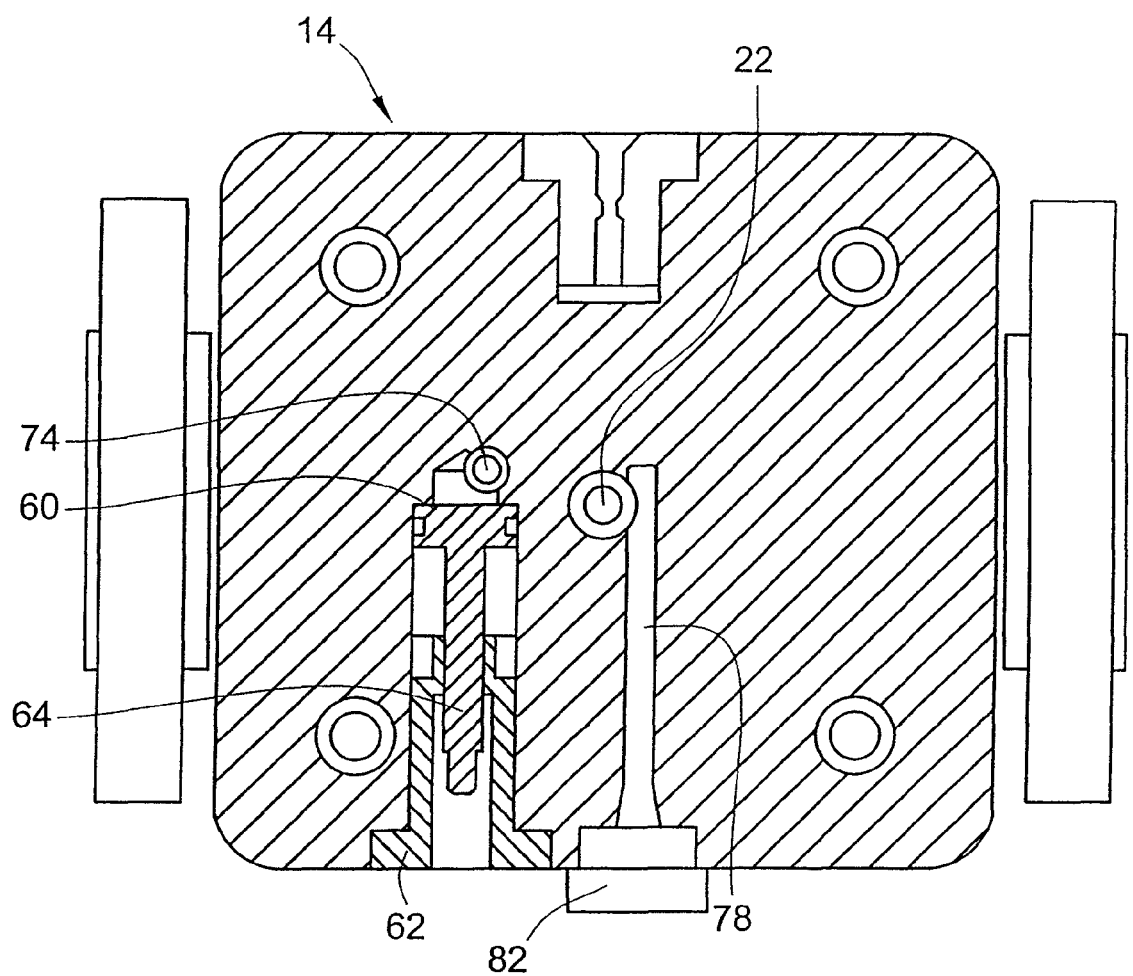
FIG. 4 is a cross sectional view of the seal mounting block shown in FIG. 3 along a section perpendicular to that taken in FIG. 3 to illustrate the details to the loading piston and the collection passageway.

Referring to FIG. 3, a preferred embodiment of the dynamic sealing arrangement has been illustrated as a seal assembly 10 for preventing leakage of process fluid and for preventing ingress of dirt, contaminants and other foreign material along a movable shaft 12 that is movable between an open position and a closed position. It is preferably incorporated into a separate seal block member 14, or other appropriate type of housing. In the preferred embodiment, the seal block member 14 is sandwiched between a spring housing 16 and a valve body 17. The movable shaft 12 may be linearly and or rotatably translatable. As shown herein, the movable shaft 12 is integrally connected to a valve member 20 that slides linearly in the valve body 17 to regulate process fluid flow along a valve passageway 21.

The novel sealing arrangement as shown herein may be employed in an electrically actuated well head valve as disclosed in Greeb et al., U.S. patent application Ser. No. 10/340,017, filed on Jan. 10, 2003, assigned to Woodward Governor Company, the entire disclosure of which is hereby incorporated by reference. However, it will be understood that certain claims appended hereto are written in a broad manner and are therefore intended to cover other applications where sealing occurs between a movable shaft and a housing.

Referring to the seal block member 14, and according to one aspect of the invention, it is a single solitary solid steel member that has formed passageways, ports, bores, chambers and/or holes formed therein. A central stepped bore 22 is formed centrally through the seal block member 14 to slidably receive the shaft 12. With the orientation shown in the figures, the stepped bore 22 includes a bottom retaining shoulder 24 and a pair of enlarged annuluses 26, 27 that may be used to help fluid communication into axially spaced chambers 28, 30 (collection chamber 30, and barrier sealant chamber 28).

Figure 1:
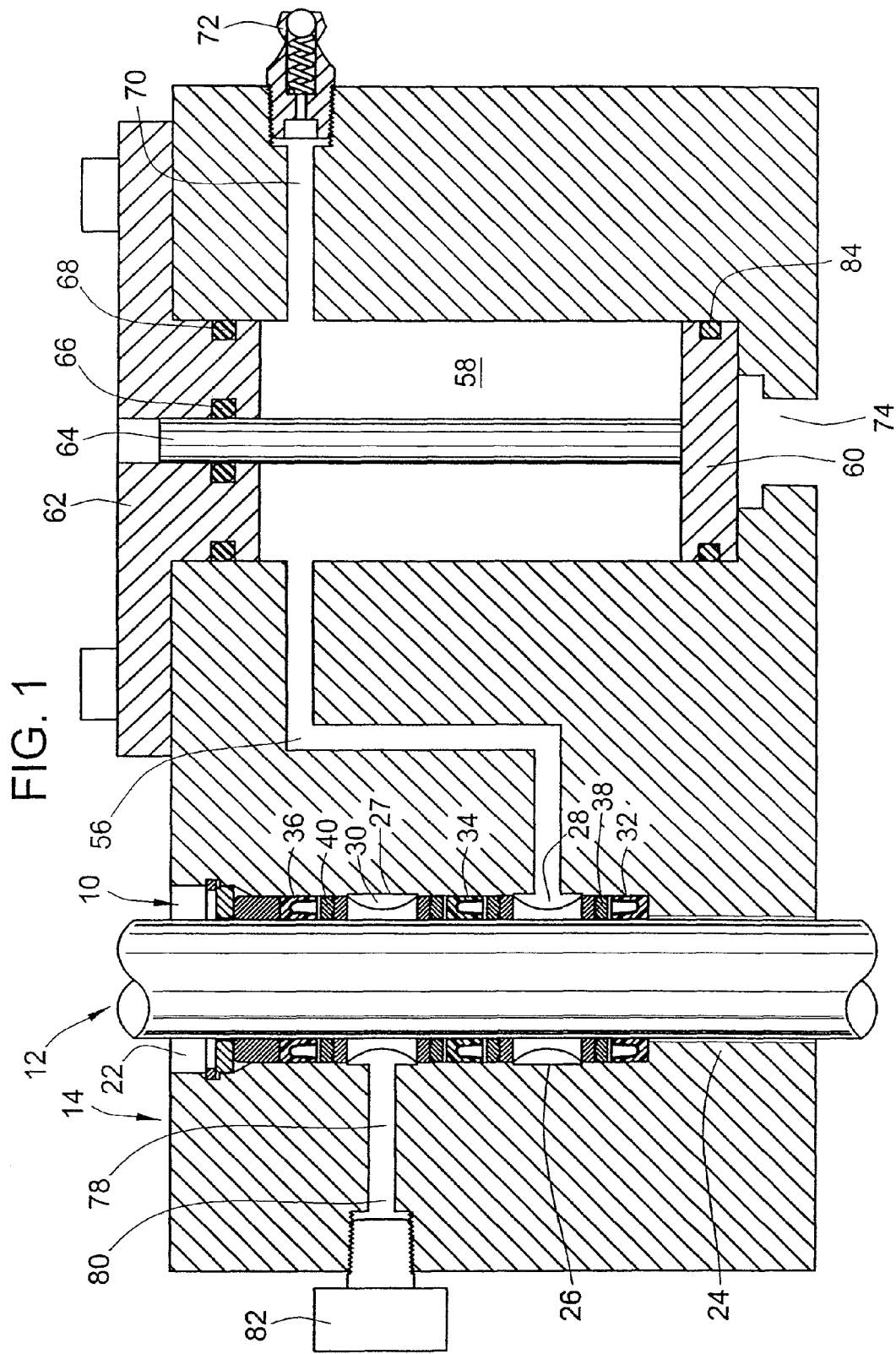
FIG. 1 is a cross sectional schematic view (schematic in that the flow passages are all shown in a single figure to provide a better understanding of the dynamic sealing arrangement in a single figure) of a seal mounting block for a movable shaft according to an embodiment of the dynamic sealing arrangement.
Figure 2:
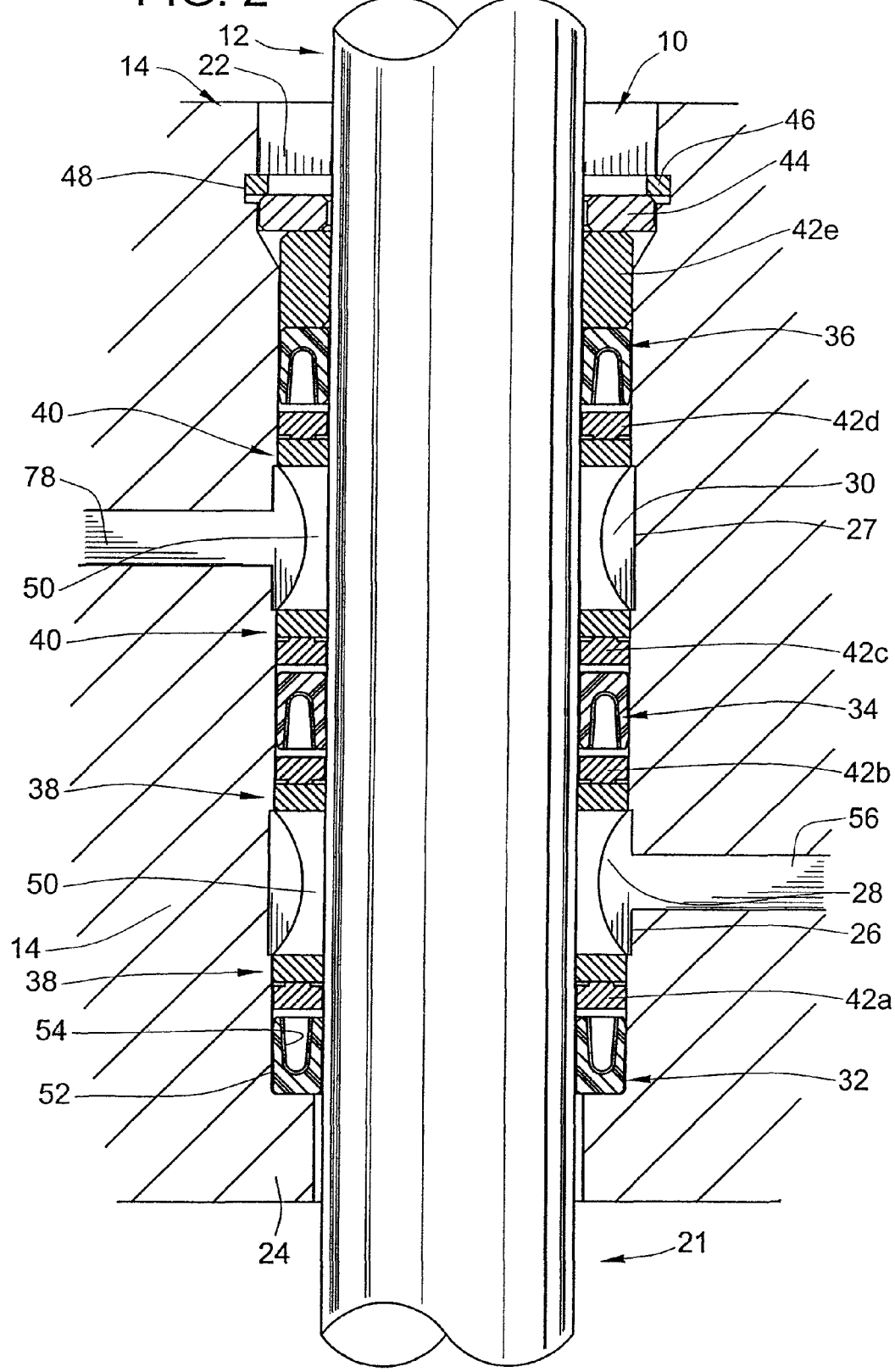
FIG. 2 is an enlarged view of a portion of FIG. 1 to better illustrate the details about the sealing arrangement along the movable shaft.

The seal assembly 10 is inserted into the bore 22 coaxial about the shaft 12. As shown in FIG. 2, the seal assembly 10 includes three seals 32, 34, 36, a pair of perforated spacer rings 38, 40, a plurality of seal retainer rings 42a-d, a cylindrical bearing retainer 42e, a washer 44 and a snap ring 46. The shoulder 24 axially supports and retains the seal assembly 10 at one end while the snap ring 46 that is removably mounted in an anchor or groove 48 at the other end of the bore 22 retains the seal assembly 10 in the bore 22. The seal retainer rings 42a-e (and shoulder 24 at one end which serves as a retainer) are placed on opposing sides of each of the seals, 32, 34, 36, and allow for some limited axial movement of the seals 32, 34, 36.

The perforated spacer rings 38, 40 define throughports 50 so as to communicate fluid radially through the seal assembly 10. The perforated spacer rings 38, 40 are arranged in respective annuluses 26, 27 and communicate fluid between the shaft surface and the respective annulus 26, 27 or inside surface of the bore.

In a preferred embodiment, the seals 32, 34, 36 are of identical construction and are all radial seals (also known as wiper seals), and may include a generally U-shaped elastomeric member 52 and a generally U-shaped metal spring member 54 that urges the legs of the elastomeric member 52 inward and outward. In this manner, each of the seals 32, 34, 36 sealingly engages radially inward against the shaft 22 and radially outward against the bore 22. The seals 32, 34, 46 are arranged in spaced relation along the shaft being separated by appropriate spacer rings 38, 40 and/or retaining rings 42a-e.

The first chamber 28 contains any appropriate barrier fluid such as grease, that is loaded to a pressure typically greater than the pressure in the valve passageway 21. To accomplish loading, the seal mounting block member 14 defines a barrier fluid passageway 56 that connects the first annulus 26 and/or chamber 28 to a formed cylindrical piston chamber 58 which is also formed in the seal block member 14.

A piston 60 (which may or may not be spring biased) is slidably mounted in the piston chamber 58 with an O-ring gasket 84 between the piston and seal block member. The piston 60 is enclosed in the piston chamber 58 by an end cap 62 that is fastened to the seal block member 14. An level indicating rod 64 integrally connected to the piston projects axially through a formed bore in the end cap 62. The level indicating rod 64 may be graduated (e.g. scale marked with spaced markings and/or numbers) to indicate how much barrier sealant fluid is contained in the system. A pair of O-ring seals 66, 68 seal between the end cap 62 and the seal block member 14 and the level indicating rod 64 and the end cap 62. An inlet passage 70 defined in the seal block member 14 provides means to fill the piston chamber 58 with barrier sealant fluid. A grease inlet port fitting stub 72 is mounted into the entrance port of the inlet passage 70.

One side of the piston 60 acts upon the barrier sealant fluid in the piston chamber 58 to pressurize the barrier sealant fluid. The other side of the piston 60 is exposed to the process fluid pressure contained in the valve passageway 21 via a drilled passage 74 extending through the seal block member 14. In this manner, the pressure of the process fluid is used to pressurize the barrier sealant fluid which in turn is communicated to the chamber between the two internal seals 32, 34. The piston 60 is selectively sized such that it may pressurize the barrier fluid to a pressure greater than the fluid pressure in valve passageway 21. Specifically a larger face is exposed to the process fluid than the barrier fluid as a result of the indicating rod 64 which is exposed to the low pressure external environment (differential piston effect). As a result, the barrier fluid pressure is self regulating and automatically adjusts to changes in process fluid pressure, if any. If desired, other types of loading apparatus may be used, such as spring mechanisms, external pressures or loads, and the like that can also exert pressure on the barrier fluid.

If leakage were to occur, which could occur after an extended service interval, leakage would most likely be barrier sealant past either of the two internal seals 32, 34 rather than process fluid. This advantageously prevents leakage of process fluid and thereby lowers environmental emissions and/or reduces the potential for a hazardous condition. Further, because barrier sealant would ordinarily be the fluid leaked, the piston 60 would tend to move or push out barrier sealant past the seal meaning that the level indicating rod 64 which is recessed would become exposed and provide an indication that there might be a leakage problem.

In one aspect, the barrier sealant system is substantially self contained in the single unitary mass of the seal block member 14. The seal block member 14 may mount directly to a valve body 18 or other pressurized reservoir or body (e.g. a pump) with a single O-ring static seal element 76 arranged and compressed therebetween to prevent leakage. No external plumbing, hydraulic couplings, tubes, conduits are needed, which substantially reduces the complexity and provides for reduced potential for leakage or failure. In addition, the pressurizing piston 60 is offset from the shaft 12 which simplifies the construction of the seal assembly 10 and thereby is thought to increase reliability of the seal assembly 10.

In accordance with another aspect, both of the seals 32, 34 which are acted upon by pressurized barrier sealant are internal type seals and therefore not exposed to mud, dirt, contaminants or other foreign matter from the external environment. This is achieved by arranging the third seal 36 as the external seal to prevent the ingress of contaminants and preventing such contaminants from reaching seals 32, 34. As a result, the seals 32, 34 (and particularly seal 34) that are subject to the largest stresses and pressures are both internal seals that are free of further stress or wear that would otherwise be induced by foreign material from the external environment.

Even further, there is a significant advantage in that the collection chamber 30 is formed between seals 34, 36. A drilled collection passageway 78 connects an output port 80 on the outside of the seal block member 14 with the collection chamber 30. This can be used for a number of purposes depending upon application, including for example instrumentation or a gas or barrier fluid sensor mechanism 82 as schematically shown. The sensor mechanism 82 is adapted to sense leakage of fluid and/or barrier sealant past the second seal. This provides an additional feature that can sense whether leakage is occurring even if not indicated by the level indicating rod for such reasons as if the piston were to be stuck, or the barrier sealant passageway plugged, or other possible reasons. If gas leakage is occurring rather than barrier sealant leakage, then the level indicating rod may not indicate a problem which the sensor mechanism 82 would. In addition, and depending upon application, mechanism 82 could alternatively be a plug plugging the output port 80, a vent filter mounted to the output port preventing external contaminants from acting upon the intermediate seal 34, and/or a pressure relief valve in fluid communication with the collection passageway arranged to allow one way flow from the collection area to the output port. Such a pressure relief valve may have a mechanism on it to show whether it has been opened also identifying whether a problem may exist.

Figure 5:
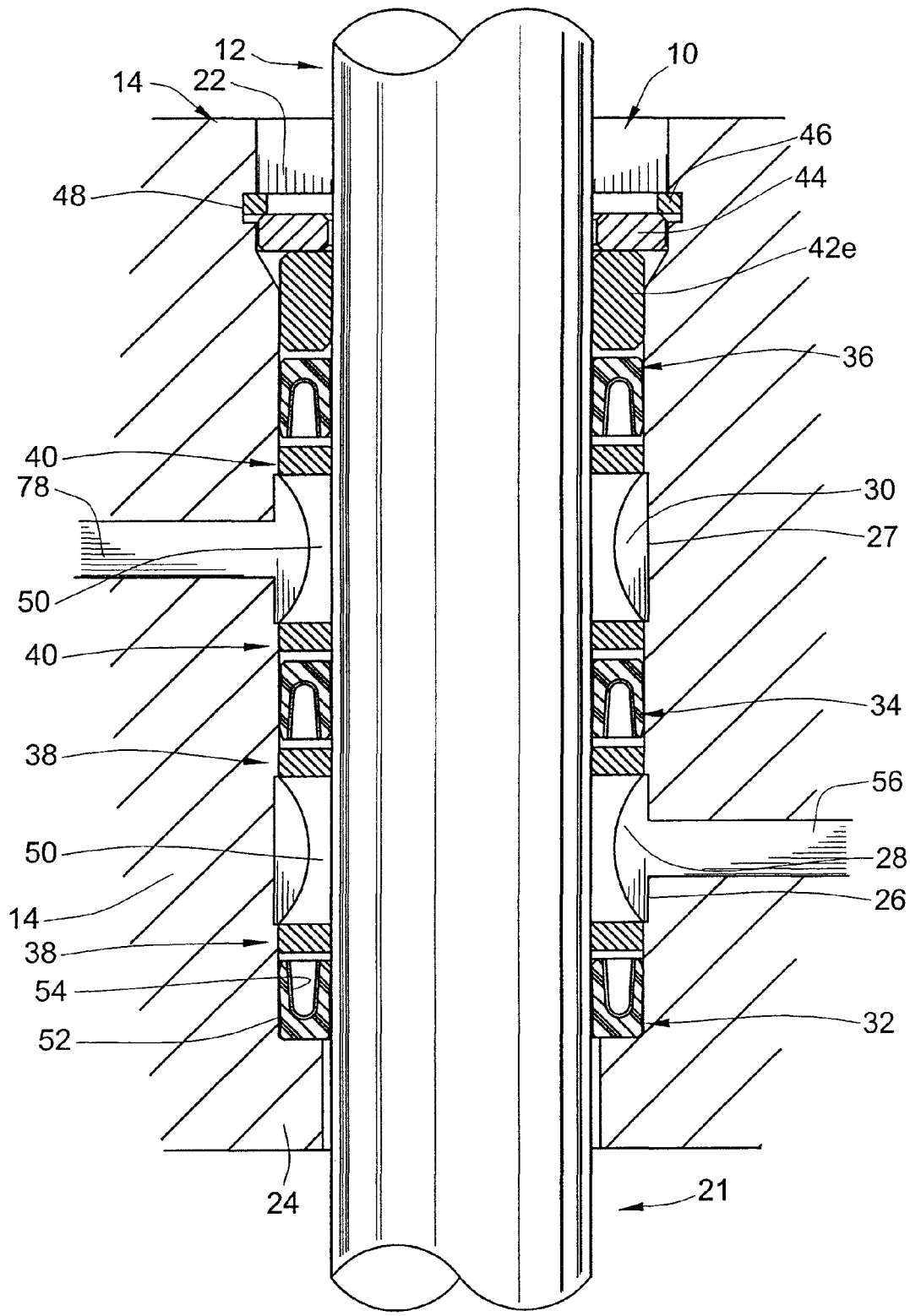
FIG. 5 is a view of a seal assembly similar to FIG. 2 but with fewer components in accordance with another embodiment.

Another embodiment with fewer components is shown in FIG. 5. In this embodiment, retainer components 42a-42d (see FIG. 2) have been eliminated. The remaining components are the same and like reference characters are used. It will be appreciated that this embodiment functions in a similar manner to the first embodiment.

All references, including publications, patent applications, and patents, cited herein are hereby incorporated by reference to the same extent as if each reference were individually and specifically indicated to be incorporated by reference and were set forth in its entirety herein.

The use of the terms "first", "second", and "third" as it pertains to the seals or other structures are used for purposes of differentiation only and do not provide any numerical differentiation or relative position limitations for the seal or other recited structure. Other terms are used in the claims for such purposes. The use of the terms "a" and "an" and "the" and similar referents in the context of describing the dynamic sealing arrangement (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the dynamic sealing arrangement and does not pose a limitation on the scope of the invention unless otherwise claimed. No language in the specification should be construed as indicating any non-claimed element as essential to the practice of the invention.

Preferred embodiments are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus for providing dynamic sealing arrangement for preventing leakage of a fluid along a movable shaft, comprising:
   a housing receiving the movable shaft therethrough, the shaft movable between an open position and a closed position;
   a first seal in the housing engaging the shaft;
   a second seal in the housing engaging the shaft in spaced relation to the first seal;
   a barrier sealant contained between the first and second seals;
   a load member adapted to pressurize the barrier sealant contained between the first and second seals:
   a third seal in the housing engaging the shaft in spaced relation to the second seal, the third seal being an external seal exposed to the ambient environment and wherein the first and second seals are internal seals protected from the ambient environment by the external seal;
   a collection area in the housing between the second and the third seals;
   a collection passageway in the housing connecting the collection area to an output port; and
   a sensor mechanism connected to the output port, the sensor mechanism adapted to sense leakage of fluid and/or barrier sealant past the second seal.

2. An apparatus for providing a dynamic sealing arrangement for preventing leakage of a fluid along a movable shaft, comprising:
   a housing receiving the movable shaft therethrough, the shaft movable between an open position and a closed position;
   a first seal in the housing engaging the shaft;
   a second seal in the housing engaging the shaft in spaced relation to the first seal;
   a barrier sealant contained between the first and second seals;
   a load member adapted to pressurize the barrier sealant contained between the first and second seals;
   a third seal in the housing engaging the shaft in spaced relation to the second seal, the third seal being an external seal exposed to the ambient environment and wherein the first and second seals are internal seals protected from the ambient environment by the external seal;
   a collection area in the housing between the second and the third seals a collection passageway in the housing connecting the collection area to an output port; and
   a plug plugging the output port.

3. An apparatus for providing a dynamic sealing arrangement for preventing leakage of a fluid along a movable shaft, comprising:
   a housing receiving the movable shaft therethrough, the shaft movable between an open position and a closed position;
   a first seal in the housing engaging the shaft
   a second seal in the housing engaging the shaft in spaced relation to the first seal;
   a barrier sealant contained between the first and second seals;
   a load member adapted to pressurize the barrier sealant contained between the first and second seals;
   a third seal in the housing engaging the shaft in spaced relation to the second seal, the third seal being an external seal exposed to the ambient environment and wherein the first and second seals are internal seals protected from the ambient environment by the external seal;

a collection area in the housing between the second and the third seals;

a collection passageway in the housing connecting the collection area to an output port; and a vent filter mounted to the output port preventing external contaminants from acting upon the second seal.

4. An apparatus for providing a dynamic sealing arrangement for preventing leakage of a fluid along a movable shaft comprising:

a housing receiving the movable shaft therethrough, the shaft movable between an open position and a closed position;

a first seal in the housing engaging the shaft;

a second seal in the housing engaging the shaft in spaced relation to the first seal;

a barrier sealant contained between the first and second seals:

a load member adapted to pressurize the barrier sealant contained between the first and second seals;

a third seal in the housing engaging the shaft in spaced relation to the second seal, the third seal being an external seal exposed to the ambient environment and wherein the first and second seals are internal seals protected from the ambient environment by the external seal;

a collection area in the housing between the second and the third seals;

a collection passageway in the housing connecting the collection area to an output port; and a pressure relief valve in fluid communication with the collection passageway arranged to allow one way flow from the collection area to the output port.

* * * * *